United States Patent
Venti et al.

(10) Patent No.: US 11,971,927 B1
(45) Date of Patent: *Apr. 30, 2024

(54) SYSTEM AND METHOD FOR CONTEXTUAL DATA SELECTION FROM ELECTRONIC MEDIA CONTENT

(71) Applicant: Look Sharp Labs, Inc., La Mesa, CA (US)

(72) Inventors: Nicholas Venti, San Diego, CA (US); Brian Karscig, La Mesa, CA (US); Tyson S. McDowell, San Diego, CA (US)

(73) Assignee: LOOK SHARP LABS, INC., La Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/049,255

(22) Filed: Oct. 24, 2022

Related U.S. Application Data

(63) Continuation of application No. 16/699,330, filed on Nov. 29, 2019, now Pat. No. 11,481,434.
(Continued)

(51) Int. Cl.
*G06F 16/00* (2019.01)
*G06F 16/638* (2019.01)
(Continued)

(52) U.S. Cl.
CPC .......... *G06F 16/638* (2019.01); *G06F 40/205* (2020.01); *G06F 40/30* (2020.01); *H04L 67/06* (2013.01); *H04L 67/10* (2013.01)

(58) Field of Classification Search
CPC ...... G06F 16/638; G06F 40/205; G06F 40/30; G06F 16/638639; H04L 67/06; H04L 67/10
See application file for complete search history.

(56) References Cited

U.S. PATENT DOCUMENTS

| | | | |
|---|---|---|---|
| 7,637,424 B2 | 12/2009 | Silverbrook | B41J 3/445 |
| 7,730,216 B1 | 6/2010 | Issa | H04L 67/104 |

(Continued)

FOREIGN PATENT DOCUMENTS

| | | | | |
|---|---|---|---|---|
| CN | 107076631 | | 8/2017 | G10H 1/0025 |
| CN | 107076631 A | * | 8/2017 | G10H 1/0025 |

(Continued)

OTHER PUBLICATIONS

Notice of Allowance issued in U.S. Appl. No. 15/490,800, dated Aug. 29, 2019 (9 pgs).
(Continued)

*Primary Examiner* — Leslie Wong
(74) *Attorney, Agent, or Firm* — HAYES SOLOWAY P.C.

(57) ABSTRACT

A computer-implemented method for contextually applying audio to an electronic media content, includes the following steps: parsing the electronic media content to determine at least one context of the electronic media content; comparing the at least one context of the electronic media content against a database of context tags corresponding to at least one context of a plurality of audio files; generating a ranked list of audio files corresponding to the comparison of the at least one context of the electronic media content against the database of context tags; selecting at least one audio file from the ranked list; and outputting the electronic media file together with the at least one audio file.

19 Claims, 5 Drawing Sheets

Method for Applying Audio

Related U.S. Application Data

(60) Provisional application No. 62/773,130, filed on Nov. 29, 2018.

(51) Int. Cl.
*G06F 40/205* (2020.01)
*G06F 40/30* (2020.01)
*H04L 67/06* (2022.01)
*H04L 67/10* (2022.01)

(56) References Cited

U.S. PATENT DOCUMENTS

| | | | |
|---|---|---|---|
| 8,819,030 B1 | 8/2014 | Freed et al. | 707/748 |
| 8,928,727 B1 | 1/2015 | Milligan | H04N 7/152 |
| 9,021,088 B2 | 4/2015 | Bilinski et al. | G06F 17/30053 |
| 9,992,316 B2 | 6/2018 | Hardi | H04M 1/6066 |
| 10,037,780 B1 | 7/2018 | Roberts et al. | |
| 10,048,931 B2 | 8/2018 | Vartakavi et al. | G06F 3/165 |
| 10,178,365 B1 | 1/2019 | Singh et al. | H04N 9/802 |
| 10,333,876 B2 | 6/2019 | Guthery et al. | H04L 51/10 |
| 10,474,422 B1 | 11/2019 | Venti et al. | G06F 3/165 |
| 10,692,537 B2* | 6/2020 | Eppolito | H04N 21/47205 |
| 10,891,103 B1 | 1/2021 | Venti et al. | G06F 3/165 |
| 10,956,945 B1 | 3/2021 | Lewis | G06Q 30/0276 |
| 11,169,770 B1 | 11/2021 | Venti et al. | G06F 3/165 |
| 11,449,306 B1 | 9/2022 | Venti et al. | G06F 3/165 |
| 11,481,434 B1 | 10/2022 | Venti et al. | G06F 3/165 |
| 2005/0147256 A1* | 7/2005 | Peters | G06F 16/683 707/E17.101 |
| 2008/0270138 A1* | 10/2008 | Knight | G06F 16/434 704/E15.045 |
| 2009/0013263 A1 | 1/2009 | Fortnow | G06Q 10/10 |
| 2009/0128335 A1 | 5/2009 | Leung | G06Q 30/02 |
| 2009/0177303 A1* | 7/2009 | Logan | G06Q 30/06 700/94 |
| 2009/0187624 A1 | 7/2009 | Brownholtz | G06Q 10/10 |
| 2009/0300670 A1 | 12/2009 | Barish | H04N 7/17318 |
| 2010/0023578 A1 | 1/2010 | Brant | G06F 16/639 |
| 2010/0031299 A1 | 2/2010 | Harrang | H04N 21/4363 |
| 2010/0164956 A1 | 7/2010 | Hyndman | G06Q 10/08 |
| 2010/0241711 A1 | 9/2010 | Ansari | H04L 12/2812 |
| 2011/0161409 A1 | 6/2011 | Nair | G06F 8/38 |
| 2011/0225417 A1 | 9/2011 | Maharajh | G06Q 10/06 |
| 2011/0261149 A1* | 10/2011 | Anuar | H04N 7/152 348/E7.083 |
| 2012/0069131 A1 | 3/2012 | Abelow | G06Q 30/0601 |
| 2012/0144343 A1* | 6/2012 | Tseng | G06F 3/0482 715/834 |
| 2012/0144979 A1 | 6/2012 | Tansley | G10H 1/0066 |
| 2012/0278387 A1 | 11/2012 | Garcia | G06Q 50/01 |
| 2012/0304087 A1 | 11/2012 | Walkin | 715/764 |
| 2013/0066964 A1 | 3/2013 | Odio | G06Q 50/01 |
| 2013/0173742 A1 | 7/2013 | Thomas | H04L 65/4076 |
| 2013/0297686 A1* | 11/2013 | Bilinski | G06F 16/4387 709/204 |
| 2014/0123041 A1 | 5/2014 | Morse | 715/765 |
| 2014/0137144 A1 | 5/2014 | Jarvenpaa | H04N 21/6582 |
| 2014/0181110 A1 | 6/2014 | Imbruce et al. | G06F 17/30598 |
| 2014/0214848 A1 | 7/2014 | Devkar et al. | G06F 17/30053 |
| 2014/0280498 A1* | 9/2014 | Frankel | H04L 65/764 709/203 |
| 2014/0289330 A1 | 9/2014 | Liu | H04L 51/32 |
| 2014/0337761 A1 | 11/2014 | Glass | H04L 65/403 |
| 2015/0089397 A1 | 3/2015 | Gorod et al. | G06F 3/0482 |
| 2015/0169747 A1* | 6/2015 | Hume | G06F 16/686 704/8 |
| 2015/0193516 A1 | 7/2015 | Harb | G06Q 30/02 |
| 2015/0195620 A1 | 7/2015 | Buchner | H04N 21/4788 |
| 2015/0215597 A1 | 7/2015 | Xu | G11B 20/10527 |
| 2015/0242525 A1 | 8/2015 | Perlegos | G06F 16/972 |
| 2015/0318020 A1* | 11/2015 | Pribula | H04N 21/2743 386/290 |
| 2015/0339300 A1 | 11/2015 | Stoddard, II et al. | G06F 17/30056 |
| 2015/0373065 A1 | 12/2015 | Holmquist | H04L 65/403 |
| 2016/0149956 A1 | 5/2016 | Birnbaum | H04L 63/20 |
| 2016/0173683 A1 | 6/2016 | Abreu | H04L 51/24 |
| 2016/0196105 A1 | 7/2016 | Vartakavi et al. | G06F 3/165 |
| 2016/0217328 A1 | 7/2016 | Yanai | G06K 9/00671 |
| 2016/0224311 A1 | 8/2016 | Touch | H04L 65/4076 |
| 2016/0227115 A1 | 8/2016 | Bin Mahfooz et al. | H04N 5/23245 |
| 2016/0246452 A1 | 8/2016 | Bockhold | G06F 3/0488 |
| 2016/0248840 A1 | 8/2016 | Bockhold | H04L 51/32 |
| 2016/0300594 A1 | 10/2016 | Allen | G11B 27/031 |
| 2017/0024399 A1 | 1/2017 | Boyle | G06F 16/903 |
| 2017/0154615 A1 | 6/2017 | Serletic et al. | G01H 1/00 |
| 2017/0289202 A1 | 10/2017 | Krasadakis | H04L 65/1069 |
| 2017/0372525 A1 | 12/2017 | Rosenthal et al. | G06T 19/006 |
| 2018/0053510 A1* | 2/2018 | Kofman | G11B 27/34 |
| 2018/0103292 A1 | 4/2018 | Zheng | A61B 5/0077 |
| 2018/0152736 A1* | 5/2018 | Alexander | H04N 21/2665 |
| 2019/0045252 A1 | 2/2019 | Lyons et al. | H04N 21/2668 |
| 2019/0163830 A1 | 5/2019 | DeLuca | G06F 17/30867 |
| 2019/0197589 A1 | 6/2019 | Singh et al. | G06Q 30/0279 |
| 2019/0286720 A1 | 9/2019 | Agrawal et al. | G06F 17/30268 |

FOREIGN PATENT DOCUMENTS

| | | | |
|---|---|---|---|
| WO | WO2013166140 | 11/2013 | G06F 17/00 |
| WO | WO2014100893 | 7/2014 | G11B 27/031 |
| WO | WO-2014100893 A1 * | 7/2014 | G11B 27/031 |

OTHER PUBLICATIONS

Notice of Allowance issued in U.S. Appl. No. 17/138,695, dated Jul. 9, 2021 (18 pgs).
Notice of Allowance issued in U.S. Appl. No. 16/592,549, dated Sep. 9, 2020 (10 pgs).
Notice of Allowance issued in U.S. Appl. No. 17/520,579, dated May 11, 2022 (19 pgs).
Notice of Allowance issued in U.S. Appl. No. 16/699,330, dated Jun. 17, 2022 (33 pgs).
Office Action issued in U.S. Appl. No. 15/490,800, dated Jun. 27, 2019 (18 pgs).
Office Action issued in U.S. Appl. No. 15/490,800, dated Sep. 7, 2018 (18 pgs).
Office Action issued in U.S. Appl. No. 16/592,549, dated Aug. 21, 2020 (9 pgs).
Office Action issued in U.S. Appl. No. 16/592,549, dated May 29, 2020 (22 pgs).
Office Action issued in U.S. Appl. No. 16/699,330, dated Feb. 17, 2022 (13 pgs).
Office Action issued in U.S. Appl. No. 17/947,799, dated Feb. 2, 2023 (12 pgs).
Bellmpasakis et al., Home Media Atomizer: Remote Sharing of Home Content—without Semi-trusted Proxies; 2008, IEEE; 9 pages.
Lee et al., Face-to-Face Media Sharing Using Wireless Mobile Devices; 2013, IEEE, 10 pages.
Maestre et al., Enriched Multimodal Representations of Music Performances: Online Access and Visualization; IEEE; 2017; 11 pages.
Oyang et al., Characterizing the Service Usage of Online Video Sharing System: Uploading vs. Playback, IEEE, 2016,7 pages.
Pering et al., Face-to-Face Media Sharing Using Wireless Mobile Device; 2005; IEEE, 8 pages.
Ren et al., "Automatic Music Mood Classification Based on Timbre and Modulation Features" *IEEE*, pp. 236-246, Apr. 29, 2015, abstract, 3 pages.
Segmentino, https://code.soundsoftware.ac.uk/projects/segmenter-vamp-plugin, accessed Jul. 8, 2021, 3 pages.
Wu et al., Bridging Music and Image via Cross-Modal Ranking Analysis; IEEE, Jul. 2016; 14 pgs.
Xing et al., Proximiter: Enabling Mobile Proximity-Based Content Sharing on Portable Devices; 2009, IEEE, 3 pages.
Zhao, "Explore Music World: Categorize Music by Mood", CCTP 607 Spring 2020, Apr. 26, 2020, https://blogs.commons.georgetown.edu/cctp-607-spring2020/2020/04/26/explore-music-world-categorize-music-by-mood 10 pages.

(56) References Cited

OTHER PUBLICATIONS

Notice of Allowance issued in U.S. Appl. No. 17/947,799, dated May 26, 2023 (11 pgs).
Hopmann et al., Virtual Shelf: Sharing music between people and devices, 2010, IEEE, 7 pages.
U.S. Appl. No. 15/490,800, filed Apr. 18, 2017, Venti et al.
U.S. Appl. No. 16/592,549, filed Oct. 3, 2019, Venti et al.
U.S. Appl. No. 17/138,695, filed Dec. 30, 2020, Venti et al.
U.S. Appl. No. 17/520,579, filed Nov. 5, 2021, Venti et al.
U.S. Appl. No. 16/699,330, filed Nov. 29, 2019, Venti et al.
U.S. Appl. No. 17/342,400, filed Jun. 8, 2021, Venti et al.

* cited by examiner

SYSTEM AND METHOD FOR CONTEXTUAL DATA SELECTION FROM ELECTRONIC MEDIA CONTENT

CROSS REFERENCE TO RELATED APPLICATION

This application is a continuation of U.S. patent application Ser. No. 16/699,330, filed Nov. 29, 2019, and claims benefit of U.S. Provisional Application Ser. No. 62/773,130 titled "Contextual Music Selector And Related Methods," filed Nov. 29, 2018, the entire disclosures of which are incorporated herein by reference.

FIELD OF THE DISCLOSURE

The present invention relates generally to selecting music to accompany an Electronic Media File (e.g. textual, static visual, moving visual, audio-visual, or any combination thereof) and, more particularly, to a contextual selector for identifying a best-fit music selection for a given Electronic Media File and related methods.

BACKGROUND OF THE DISCLOSURE

Scoring video and pictures with audio has long been recognized as a way to improve a viewer's experience while watching a video. There are a great many works, from social media posts to text messages viewed by people that would be much more engaging if they had the perfect audio track, especially a musical soundtrack. Adding a soundtrack that fits to any experience is truly immersive. Just imagine how dull it would be to watch Top Gun without 'Danger Zone' playing in the background. For many years, scoring was relegated to the realm of talented composers and music editors, who were able to combine a keen ear for music with a vast knowledge of musical pieces. Software programs have endeavored to improve the scoring process. Prior systems have been used to find audio to pair with other media of any kind. However, these software systems are focused on selecting an entire audio file using the properties of the file or meta-data attached to the audio file as a whole. For example, an entire song may be classified according to a single genre, emotional feel, or focus. The same is true when such systems are streaming audio media where, while they might start from a particular time index, that time index is not derived from a user's or systems query based on content context. Such time index selectors are based on the time index itself (such as where a user last left off listening).

There are limitations to this approach. Where the prior systems allow for the selection of audio, such selection is based upon an active user search, which may be inefficient for users without a particularized knowledge of audio scoring and music libraries. Moreover, when searching, the software time indexing is not determined based on contextually useful time points in the audio files.

There are other problems on the content creation and distribution side. Music artists, who create audio works, want their music to be heard in as many arenas as possible. However, it remains difficult to integrate audio works across multiple libraries with many types of common electronic media—social media. On one hand, music licensing has made integrating difficult. But even if the music were cleared for use on social media, the users would not easily find that perfect song to fit the moment.

Thus, a heretofore unaddressed need exists in the industry to address the aforementioned deficiencies and inadequacies.

SUMMARY OF THE DISCLOSURE

Embodiments of the present disclosure provide a computer-implemented method for contextually applying audio to an electronic media file. Briefly described, in architecture, one embodiment of the method, among others, can be broadly summarized by the following steps: parsing the electronic media file to determine at least one context of the electronic media file; comparing the at least one context of the electronic media file against a database of context tags corresponding to at least one context of a plurality of audio files; generating a ranked list of audio files corresponding to the comparison of the at least one context of the electronic media file against the database of context tags; selecting at least one audio file from the ranked list; and generating an output file containing the electronic media file and the at least one audio file.

The present disclosure can also be viewed as providing a system for contextually applying audio to an electronic media file. Briefly described, in architecture, one embodiment of the system, among others, can be implemented as follows. A system for contextually applying audio to an electronic media file includes a user computer device and a first database in communication with the user computer device over at least one network connection. The first database contains data corresponding to a plurality of context tags corresponding to at least one context of a plurality of audio files. At least a second database is in communication with the user computer device over at least one network connection. The at least second database contains data corresponding to the plurality of audio files. The user computer device is configured to parse the electronic media file to determine at least one context of the electronic media file, compare the at least one context of the electronic media file against the first database of context tags, generate a ranked list of audio files corresponding to the comparison of the at least one context of the electronic media file against the database of context tags, select at least one audio file from the ranked list, and generate an output file containing the electronic media file and the at least one audio file. The at least one audio file is accessed from the at least second database.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The invention described herein allows a user, software application, or software system to search for and apply to an electronic media file audio files and segments of audio files matching the context and intended presentation of the electronic media file. Further, this invention performs a predictive selection of the "best fit" audio segment for the electronic media file based upon the content of the electronic media file itself, including text, tags, emojis, images, video, available location data, and any other data made available at the time of music selection. The methods, software, and systems described herein may be used with electronic media files that have already been created and with streaming real-time electronic media files to continually select the best fit audio for the content of that streaming real-time media. This may have applications in Augmented Reality environments where video of the real world is streamed into a processor and the user's location and environment may be known by a system to extract context to enable predictive search of best-fit audio. This invention therefore permits a user to find the best-fit audio segment and attach it to an electronic media file or accompany, in parallel, real-time video and location feeds, nearly effortlessly with no special skill and minimal added effort. Further, the invention permits one-to-few click refinement of search based upon selectable tags so subsequent predictive recommendations are more likely best-fit for the user.

In one example, the methods, software, and systems described herein may be applied to create a "sound track" of a user's life experience. With technology able to know where a person is, see what a person is seeing, and hear what a person is hearing in real time, it becomes possible to create audio scoring to accompany everyday activities. In another example, the methods, software, and systems described herein make the complex act of finding the perfect sound and attaching it to an electronic media file nearly effortless.

In one respect the invention may be characterized by the following high-level processes:
1. Creating context tags for audio files that permit users, applications, and system to search audio files by context;
2. "Lifting" context off of electronic media posts and other compositions via text, emoji, image, and video analysis;
3. Soundtracking electronic media posts with no special skills required and no or very little effort.

Figure 1:
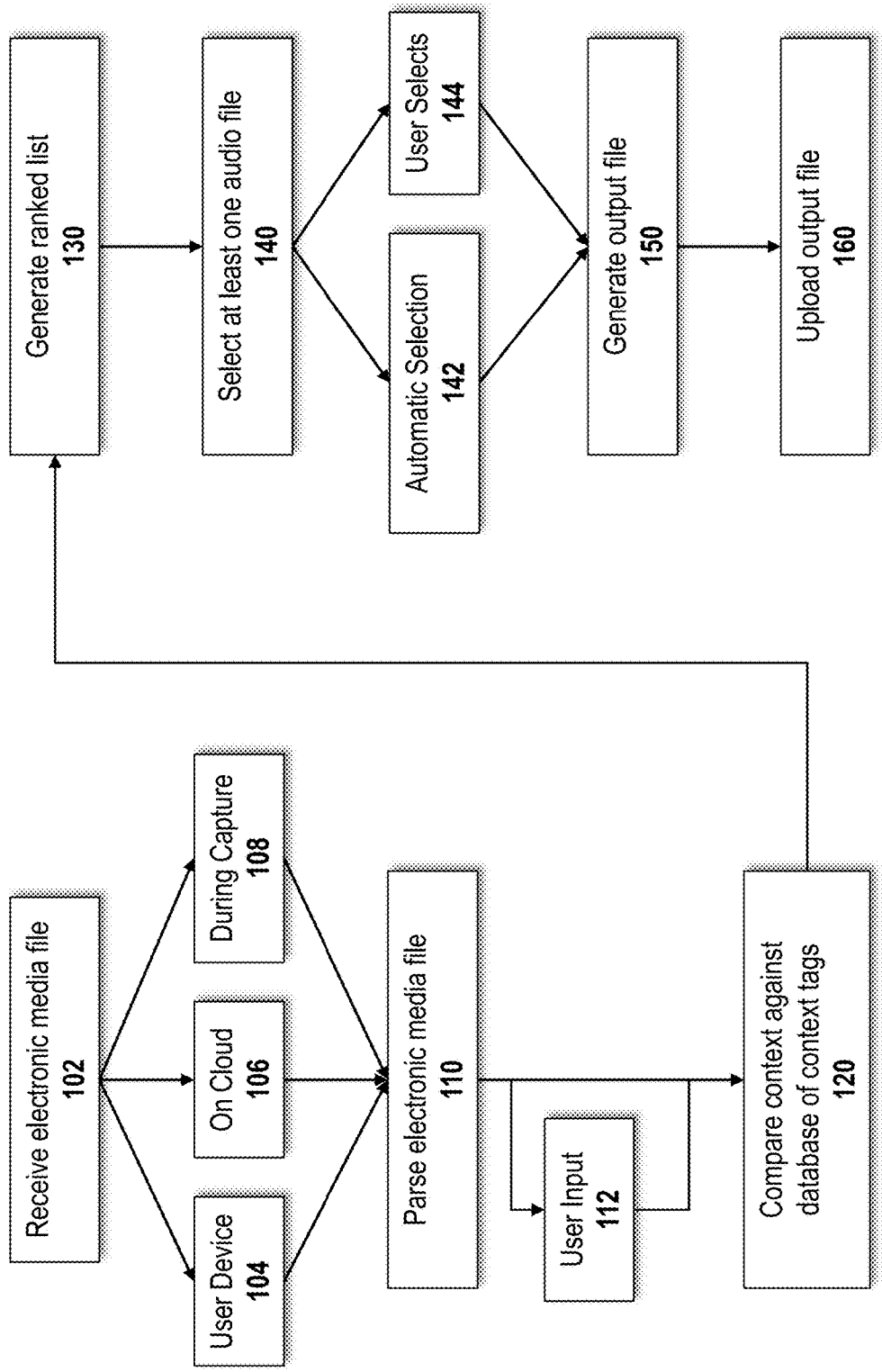
FIG. 1 is a flowchart illustration of a method for contextually applying audio to an electronic media file, in accordance with a first exemplary embodiment of the present disclosure.

FIG. 1 is a flowchart illustration 100 of a method for contextually applying audio to an electronic media file, in accordance with a first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

In one example, Step 102 first includes receiving an electronic media file. An electronic media file may be defined as any computer-readable media data that is accessible by a computer device. In one example, this may include files or portions of files accessed directly, i.e., by opening the file. In another example, this may include files or portions of files accessed over a network connection, such as by streaming or casting. The electronic media file may be any suitable type of electronic media, including digital images, photographs, videos, animations, animated gifs, audio recordings, sound clips, text documents, internet posts, streams or feeds thereof, and the like. It is generally contemplated that the method for contextually applying audio to an electronic media file will be used on visual media, for instance, images, text, and videos. However, application of the method to any suitable electronic media files is understood to be within the scope of this disclosure.

The electronic media file may be received on a computer device. "Received" may be understood to be any action that allows a user to access the electronic media file. In one example, the electronic media file may be downloaded, captured, or stored into permanent memory on the computer device. In another example, the electronic media file may be made accessible by storage in temporary memory, as in streaming over a network connection or access over an internet site. In one particular example, the electronic media file may be received on a user device, shown in Step 104. A user device may include a user's desktop computer, laptop computer, smartphone, tablet, camera, smart television, or other personal computing devices. The electronic media file may be captured, stored, or otherwise accessed from the user device's permanent memory. In another particular example shown in Step 106, the computer device may be a computer device on the cloud. For instance, the electronic media file may be stored on a cloud computer, server, or other cloud-accessible medium. The cloud computer device may receive the electronic media file and allow the user to access it using a user computer device. In another particular example shown in Step 108, the electronic media file may be received during capture. This may mean that a computer device may access the electronic media file substantially in real time. For instance, a video being streamed in real time over a network may be received by the computer device. As another example, a video being recorded onto a user device may be received and accessed while the video is being recorded. This may allow audio to be applied in real time or substantially in real time, i.e., shortly after the event captured by the electronic media file has occurred. The electronic media file may be received in any way described above or in any combination of ways thereof.

It should be noted that the method may be implemented by one or more computers or computer devices suitable for performing the processes described herein. The one or more computers or computer devices may include multiple processors within the same machine, multiple machines in the same location, and multiple machines located at different locations and connected across a network system. The network system may include any suitable wired or wireless network system, including Ethernet, LAN, WLAN, Internet, intranet, Wi-Fi, Bluetooth®, near field communication, satellite, and the like. All or a portion of the processes described herein may be performed, in whole or in part, by the one or more computers or computer devices. For example, a cloud computer device may host an application, which may receive the electronic media files, while a user computer device may connect to the cloud computer device over a network system to perform other steps described in the flow chart 100. One or more of these steps may be at least partially performed by the cloud computer device. In another example, the user device may perform all of the steps herein.

Step 110 includes parsing the electronic media file to determine at least one context of the electronic media file. The electronic media file may include subject matter. For visual media, this may include the content of an image, such as persons, locations, landscapes, objects, colors, words, text, symbols, textures, lighting, and the like. For audiovisual media, this may include any of the above, as well as spoken words, sounds, noises, and the like. The electronic media file may be parsed in order to identify the subject matter and determine a context. The context may include information identifying and describing the event or thought being captured by the electronic media file. For example, an image with a subject matter of two people in close proximity to one another may indicate a context of friendship or close relationship. A video showing a sports team playing a game may indicate a context of excitement, community, or action. A text document may indicate a context based on the words within the document.

Parsing may include examining one or more portions of the electronic media file. For instance, parsing an image may include examining portions of the image, such as the center, leading lines, portions according to the "rule of thirds" used in photography, and so on. Parsing an image may include attempting to identify the subject matter of the image by analyzing one or more portions of the image. Parsing a video may include examining portions of the video less than the entire duration of the video, for instance, clips of a few seconds in length. Visual and audio information may be parsed separately or together.

In practice, parsing may be performed by any suitable computer techniques, such as machine learning, computer vision, audio processing, sound fingerprinting, language processing, optical character recognition, and the like. One or more computer devices, including user computer devices, cloud computer devices, and the like may perform the parsing step. Parsing may also include the extraction and consideration of metadata, such as the date, time, and location where the electronic media file was created, the lighting and color data, and other visual data such as ISO, exposure, F/#, zoom, and the like.

In step 112, a user may also provide user input. User input may include identification of people, locations, or activities described in the electronic media file, determination of the mood or feel of the electronic media file, the intended use of the electronic media file, and the like. In one example, the user may be prompted to provide the input or may actively provide input using a button or form. In one particular example, the user may be prompted to select contextual input from a list. The user-provided input may be used to determine the context of the electronic media file. In one example, user-provided input may be the primary factor in determining the context of the electronic media file.

In one example, the electronic media file may include more than one context. For instance, a video file may include one context based on the persons in the video, another context based on the location of the video, and still another context based on an action that occurs partially during the video. In cases where the electronic media file includes multiple, different contexts, a primary context may be determined, followed by a secondary context, tertiary context, and so on. Audio to be applied by be determined by weighting the contexts, for instance, first, by the primary context, then according to the remaining contexts in order. In another example, all of the contexts may be weighted equally, and the audio to be applied may be determined according to a best match of all contexts. In another example, contexts may be determined for a portion of the electronic media file. For instance, a video having multiple contexts therein may be determined to have a first context for a first portion of the video, a second context for the next portion of the video, and so on. Audio to be applied may be determined according to each context at the particular point in the electronic media file.

Step 120 includes comparing the at least one context of the electronic media file against a database of context tags corresponding to at least one context of a plurality of audio files. The at least one context may be given a value that may be used to search a database. The database may include one or more databases in communication with the one or more computer devices implementing the method. For instance, an application running over a cloud-connected network may access a database over the internet. The database may be any suitable database, data lake, or other data storage medium.

The context tags may be entries in the database containing data corresponding to the context of audio files. An audio file may be defined as any computer-readable audio data that is accessible by a computer device. In one example, this may include files or portions of files accessed directly or indirectly, i.e., by opening the file. In another example, this may include files or portions of files accessed over a network connection, such as by streaming or casting. Audio files may include songs, dialogue, sound effects, noises, streams or feeds thereof, and the like. Importantly, audio files may be understood to include portions of songs, dialogue, sound effects, noises, streams or feeds thereof, and the like. For instance, an audio file may include the chorus of a song, or an emotional moment, or a particular duration of a piece. Context tags may contain information about the context of the audio file at a particular point in the audio file. For example, context of the audio file may include the genre, mood, tempo, feel, lyrical content, performing artist, subject matter, and the like. Context tags may include indicators for one or more of these categories. A single audio file may include at least one context tag. In one example, each audio file may include a plurality of context tags corresponding to the context of the audio file at different points in the audio file.

The comparison of the at least one context of the electronic media file against the context tags in the database may include any suitable comparison methods. For example, the computer device may search for any context tags matching the context of the electronic media file. In another example, the computer device may search for context tags matching a primary context first, then a secondary context, and so on. Where an electronic media file has multiple contexts, the computer device may search the database for different audio files matching each context or for a single audio file matching at least a portion of the multiple contexts.

Step 130 includes generating a ranked list of audio files corresponding to the comparison of the at least one context of the electronic media file against the database of context tags. The ranked list may include at least one audio file corresponding to at least one context tag compared to the context in Step 120. In one example, the ranked list may include a plurality of audio files. The list may rank the plurality of audio files according to how well each audio file's context matches the context of the electronic media file. Where audio files have a plurality of contexts, one or more portions of the audio file corresponding to the context of the electronic music file may be ranked high on the list, while other portions of the audio file may be ranked lower.

Step 140 includes selecting at least one audio file from the ranked list. In one example shown in Step 142, the selection may be made automatically by the computer device. For instance, the audio file at the top of the ranked list may be automatically selected. Or audio files with contexts matching the electronic media file's context above a certain threshold value may be automatically selected. In another example, shown in Step 144, the user may select the at least one audio file. The user may select the at least one audio file using a graphical user interface, discussed in greater detail in FIGS. 2-3, below. The user may sample an audio file and may accept or reject it. In one particular example, the user may accept or reject each audio file on the ranked list in the sequential order of the ranked list. For instance, the user may sample the first audio file on the list, reject it, and continue to the next audio file on the list, until the user has found a desired audio file to select.

In one example, the audio file may be positioned to be synchronized to one or more chronological points in the electronic media file. For instance, the audio file may be synchronized with the electronic media file such that the context of the electronic media file and the context of the audio file are observable at substantially the same time during playback. As an example, where a particular event occurs within a video, providing a particular context to the video, the audio file providing the matching context may be positioned to play during that event. In an electronic media file having multiple, different contexts, multiple audio files may be positioned to be synchronized when each context becomes observable. Positioning may be automatically determined by the computer device. The computer device may synchronize or align the occurrence of a context determined in Step 110 with the occurrence of a context indicated by a context tag of the audio file. In one example, the user may determine the positioning of the audio file with respect to the electronic media file.

Step 150 includes generating an output file containing the electronic media file and the at least one audio file. In one example, the output file may be a new file, different from the electronic media file and the audio file. The output file may be an audiovisual media file, such as a video file, including both sound and visual elements. The format of the output file may be any suitable audiovisual media format. The output file may include the content of the electronic media file, along with the at least one audio file synchronized with it as described above. In one example, the audio file may be overlaid upon the electronic media file. Any audio originally in the electronic media file may remain in the output file, along with the new audio from the audio file. In another example, the audio file may overwrite the audio originally in the electronic media file so that the only audio in the output file comes from the audio file. In another example, a portion of the audio originally in the electronic media file may be overwritten, and a portion may not be overwritten. In another example, the audio file may only be applied to a portion of the electronic media file.

In one example, the computer device may not generate an output file, but may instead output the electronic media file and the at least one audio file in a way that they may be observed simultaneously as though a new file had been created. For instance, the computer device may create a set of playback instructions that play the electronic media file and the at least one audio file at the same time or according to a schedule that makes them apparently synchronized at one or more desired points in the electronic media file. Any observers, including the user, recipients, and other users on electronic media sites may observe the playback as though it is through a single, new file.

The audio files may be located on one or more computer devices, including user computer devices, cloud-connected computer devices, databases, and the like. The audio files may be accessed from any suitable computer device.

Step 160 includes uploading the output file to an electronic media site. The electronic media site may be any website, application, or interface suitable for posting electronic media content, such as social media sites, social media applications, online forums, bulletin boards, comment sections, blogs, websites, and the like. The output file may be uploaded according to the usual process for posting to the electronic media site. In one example, the output file may not be loaded directly onto the site (or onto the servers associated with the site), but may be shared or streamed from a cloud-connected computer device.

In one example, at least some of the steps of the above method may be performed while the electronic media file is being created or captured, for instance, as a video is being recorded or streamed. In one example, the steps of parsing the electronic media file to determine at least one context of the electronic media file and comparing the at least one context of the electronic media file against a database of context tags corresponding to at least one context of a plurality of audio files may be performed while the electronic media file is being created. The remaining steps may be performed after the electronic media file has been created. For instance, as a video is being captured on a user device, the computer device may parse the video to determine a context and compare the determined context against a database of context tags. When the video has finished recording, a ranked list of audio files may be presented to the user for selection.

The method may further include any other features, components, or functions disclosed relative to any other figure of this disclosure.

Figure 2:
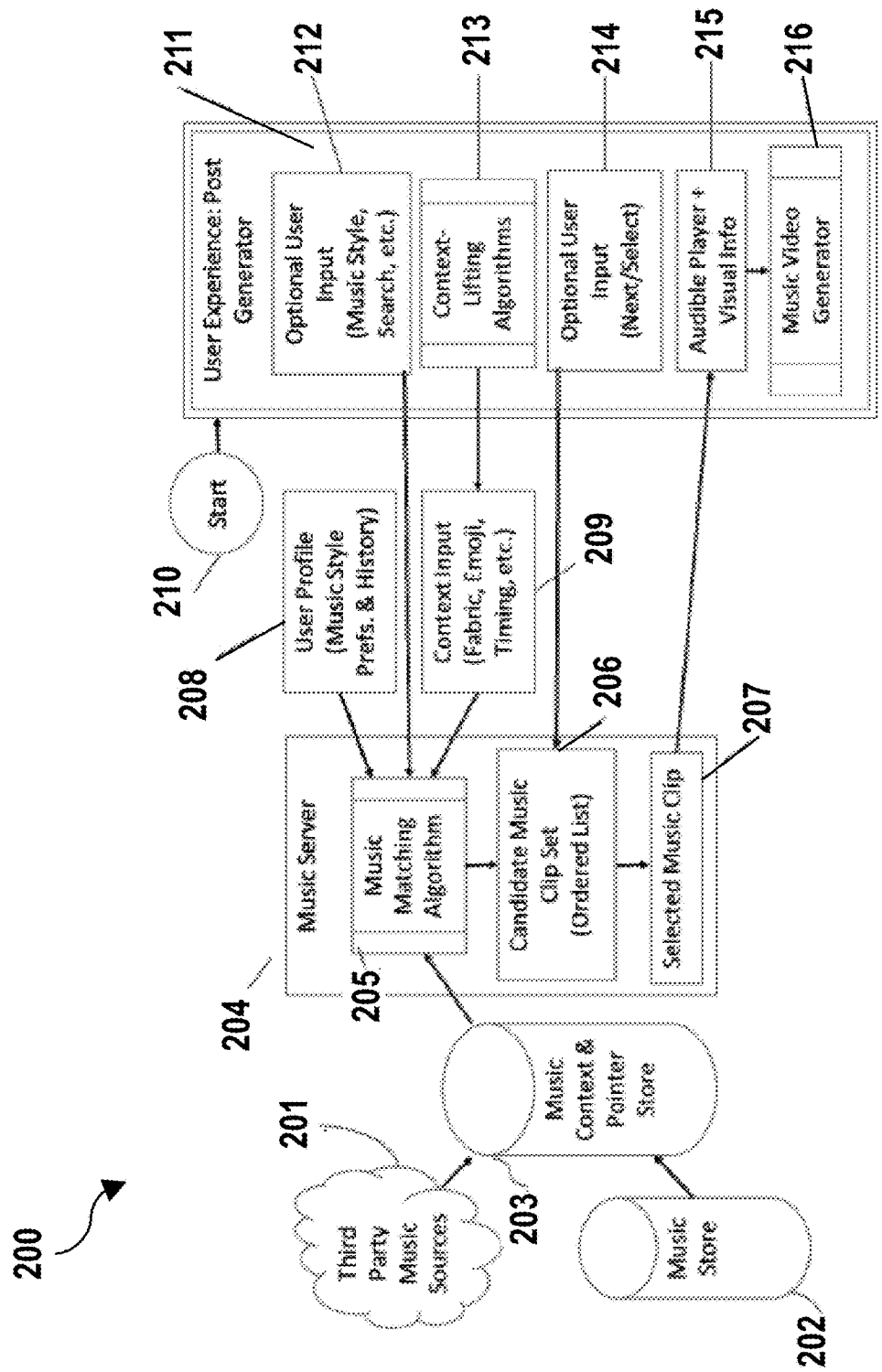
FIG. 2 is a system diagram illustrating a software system for contextually applying audio to an electronic media file, in accordance with the first exemplary embodiment of the present disclosure.

FIG. 2 is a system diagram illustrating a software system 200 for contextually applying audio to an electronic media file, in accordance with the first exemplary embodiment of the present disclosure. The software system 200 may include software modules, stores, engines, and generators configured to perform the methods and processes described herein. In particular, the software system 200 may include music components, user components, and user post components. Music components may include a music server 204, which may include music matching algorithms 205, candidate music clip sets 206, and selected music clips 207. A music context and pointer store 203 may be included, which may provide access to a music store database 202 and third party music sources 201 accessible over a cloud network. The music matching algorithm 205 may utilize user components, such as information from a user profile 208, and content input 209. User profile 208 information may include a user's historical musical preference, history, and choices. Context input 208 may include fabric, emojis, timing, and the like. Candidate music clip sets 206 may include a ranked, ordered list. And selected music clips 207 may include audio files chosen by the software system 200 or the user.

The user post components may include a user interface, which may allow the user to interact with the software system 200. A user may start at box 210 and interact with a post generator 211. The post generator 211 may allow the user to create an output file by proceeding through a number of processes, including optional user input 212, context-lifting algorithms 213, optional user input 214, audible player and visual information 215, and a music video generator 216. The optional user input 212 may include input from the user directed to the desired music style, a search function, and the like. Context-lifting algorithms 213 may determine the context of an electronic media file for use within the music matching algorithm 205 by way of the context input 209. The optional user input 214 may allow a user to select an audio file from the candidate music clip set 206 by sequentially selecting or rejecting the candidate audio files. The audible player and visual information 215 may appear on the user interface once the selected music clip 207 has been chosen. The music video generator 216 may process the output file for use and dissemination.

Figure 3:
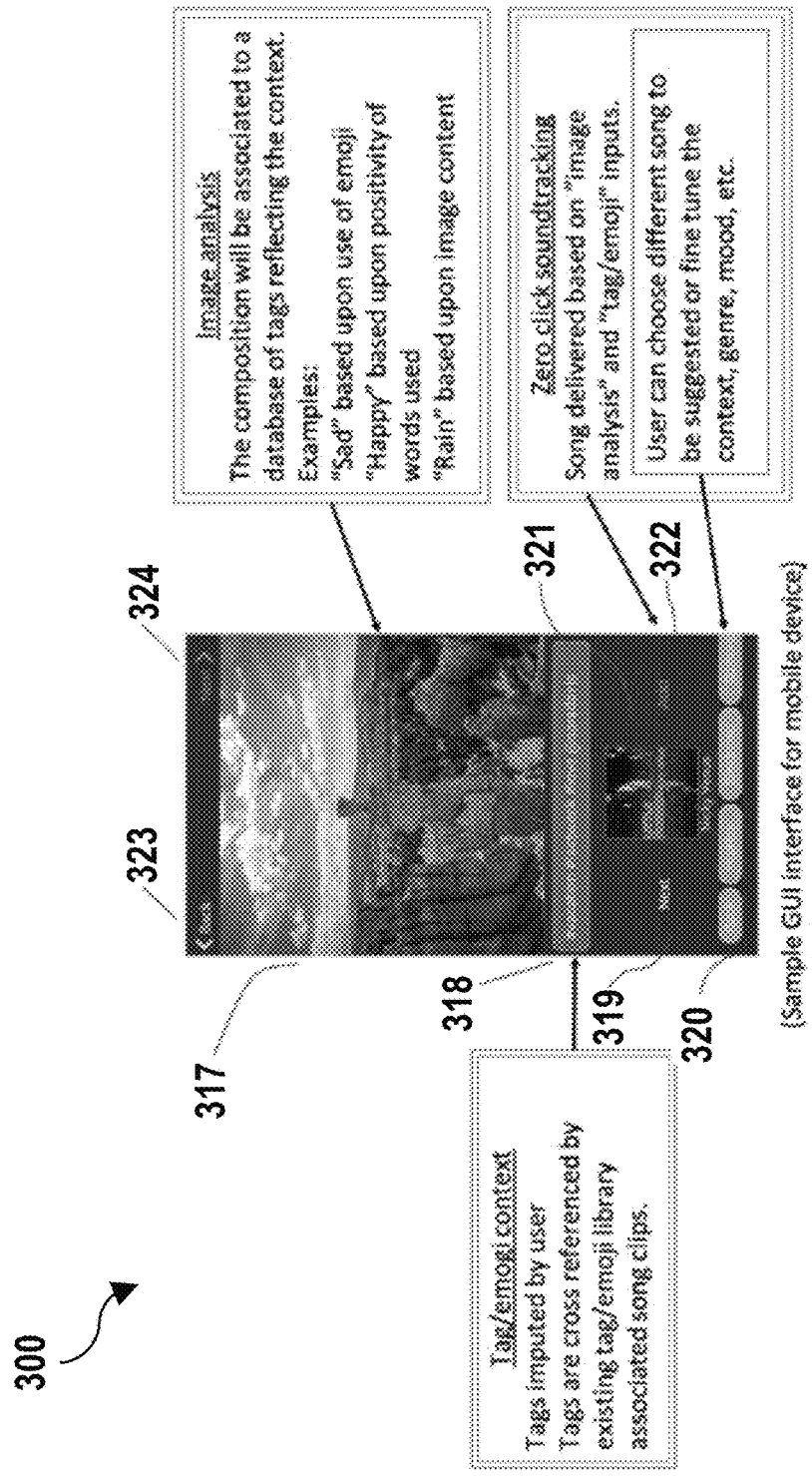
FIG. 3 is a system diagram illustrating an exemplary graphical user interface for the software system for contextually applying audio to an electronic media file, in accordance with the first exemplary embodiment of the present disclosure.

FIG. 3 is a system diagram illustrating an exemplary graphical user interface 300 for the software system for contextually applying audio to an electronic media file, in accordance with the first exemplary embodiment of the present disclosure. The graphical user interface (GUI) 300 may include visual elements on a screen 317 to allow a user to operate and navigate the software system 200. Exemplary visual elements may include back and next buttons 323, 324 to allow the user to navigate between files or between stages in the software system 200. In one example, a context display 318 may be viewed on a portion of the screen 318. The context display 318 may indicate any contexts determined by the software system 200, including context tags imputed by the user, as well as tags and emoji contexts determined in FIG. 2. Tags may be cross-referenced by existing tags or emoji libraries corresponding to the associated audio files or portions of audio files. The GUI 300 may allow the user to navigate between suggested audio files with elements such as a "next" button 319, "add" button 322, and context buttons 320. The next button 319 may allow the user to advance the ranked list of suggested audio files to the next file on the list. The add button 322 may allow the user to select a suggested audio file for use with the electronic media file. The context buttons 320 may provide graphical contexts to allow the user to refine or amend the contexts being searched, for instance, the genre, mood, context, and the like. Box 321 may show the currently-suggested and/or currently playing audio file delivered based on the software system 200's analysis. In one example, the analysis may include an image analysis. The composition may be associated with a database of tags reflecting the context, for example, "sad," based upon the use of an emoji; "happy," based upon the positivity of the words used; or "rain" based upon the image content. This may allow a user to achieve zero-click soundtracking, which may include audio files delivered based solely on the software system 200's analysis of the electronic media file and inputs.

Figure 4:
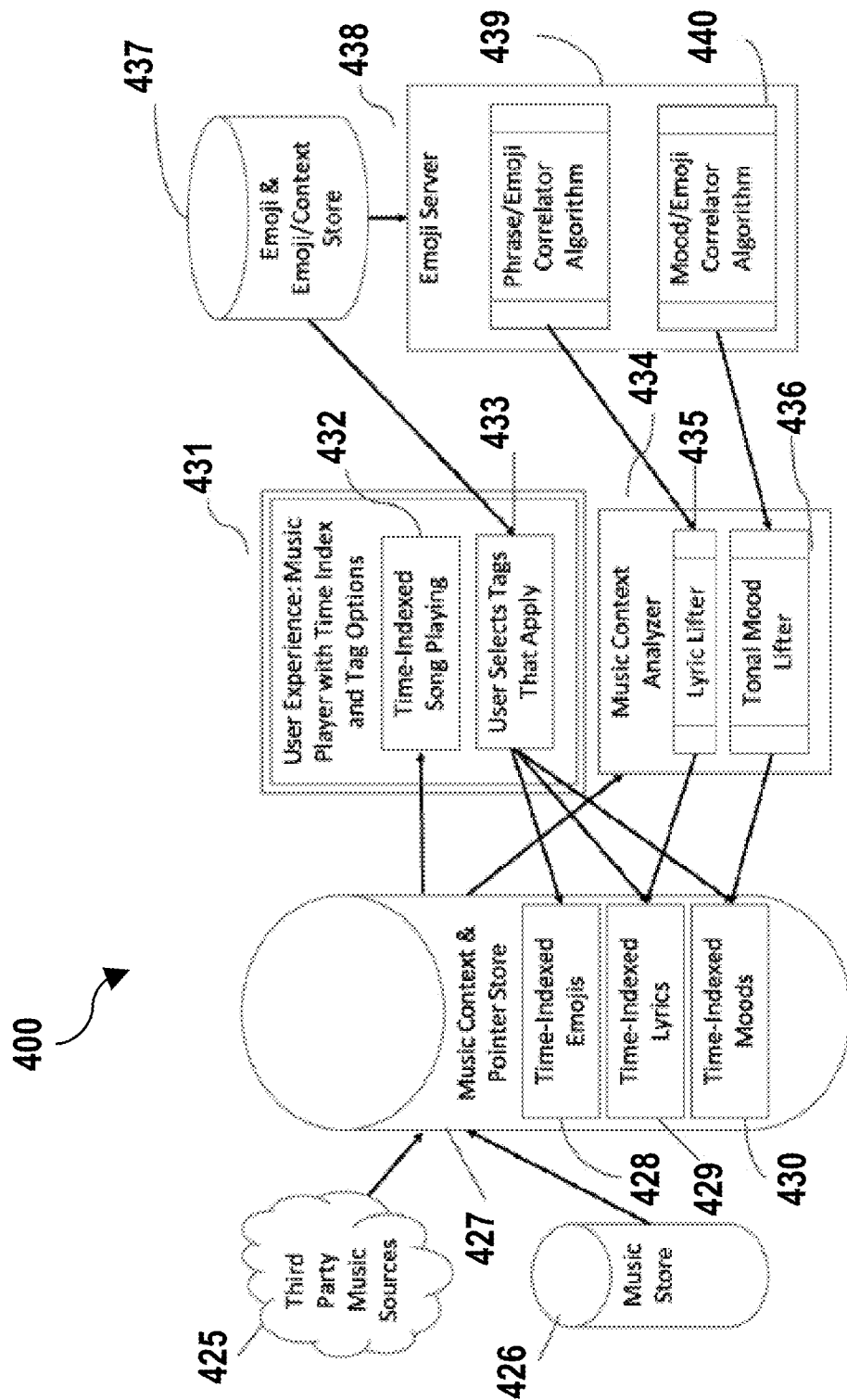
FIG. 4 is a system diagram illustrating a software system for contextually tagging audio files, in accordance with the first exemplary embodiment of the present disclosure.

FIG. 4 is a system diagram illustrating a software system 400 for contextually tagging audio files, in accordance with the first exemplary embodiment of the present disclosure. The software system 400 may include music components, such as a music context and pointer store 427. The music context and pointer store 427 may include contexts and other identifiers that can be used to locate audio files, including time-indexed emojis 428, time-indexed lyrics 429, and time-indexed moods 430. The time-indexed tags 428, 429, 430 may inform the software system 400 of the identity and chronological location of audio files matching a desired context according to emojis, lyrical subject matter, and perceived mood. Exterior music sources may be in communication with the music context and pointer store 427, including third party music sources 425 accessible over at least one network connection and music stores 426. The time-indexed tags 428, 429, 430 may point to specific locations of specific audio files located within the third party music sources 425 or music stores 426. User experience element 431 may include a music player with time index and tag options. This may include time-indexed song playing 432, for example, of audio files suggested by the software system 200. The time-indexed song playing 432 may follow from audio files selected through the music context and pointer store 427. The user experience element 431 may also allow the user to select tags that apply 433, as described in FIG. 3, above. This may influence the time-indexed tags 428, 429, 430 in the music context and pointer store 427 that are searched. A music context analyzer element 434 may include a lyric lifter 435 and a tonal mood lifter 436. The lyric lifter 435 may parse the lyrics of an audio file to determine at least one context from the lyrics. The at least one context may become time-indexed lyrics 429 in the music context and pointer store 427. The tonal mood lifter 436 may parse the audio file to determine the tone or mood of the file based on, for example, chord progressions, instruments used, pulse, beat, tempo, volume, and the like. The determined tone or mood may become the time-indexed moods 430 in the music context and pointer store.

An emoji and emoji context store element 437 may include a database of emojis and corresponding contexts. The emoji and emoji context store 437 may be in communication with an emoji server 438, which may include a phrase and emoji correlator 439 and a mood and emoji correlator 440. The phrase and emoji correlator 439 may assist the lyric lifter 435 in identifying and applying appropriate tags to the audio file based on a correlation of the lyrics and the emojis associated with the audio file. The mood and emoji correlator 440 may assist the tonal mood lifter 436 in identifying and applying appropriate tags to the audio file based on a correlation of the mood or tone and the emojis associated with the audio file.

It should be understood that any discussion related to music, music clips, particular music sources, and the like are exemplary in nature to help illustrate the methods and computer systems described herein. The methods, software applications, and computer systems described herein may be used with electronic audio files of any suitable nature, from any suitable source, and according to any suitable context. The discussion herein may be further understood with reference to FIG. 1, above. With reference to FIGS. 2-4, the present disclosure describes best-fit audio selection and related methods via computer systems including computer hardware and software for implementing various functionalities. The functionalities may include, but are not necessarily limited to, zero-click soundtracking functionality, contextual music selection functionality, and/or the contextual music tagging functionality, as will be described in detail below. In one aspect, various embodiments of the invention include a graphical user interface, which may be embodied as an overlay viewer of electronic media which may include emojis, text, tags, video, images, audio, location data, and other data made available to the viewer. This viewer may overlay any electronic composition editor or builder such as a phone keyboard, social media post generator, and more, as shown in box 211 of FIG. 2. Once the electronic media is loaded into the viewer, a context analyzer evaluates the content and prepares a list of context elements to be used in a search query for applicable music segments, as shown in box 213. Examples of such context are specific emotions, image components such as person or scenery and mood based upon warmth of color, and more. A music query generator then reads the "lifted" context and prepares a query to search for applicable music segments and return a prioritized list of music, sorted by calculated applicability with "best-fit" at the top, as shown in box 204. At any time, the query may be updated by changes in the electronic media itself within the viewer, or by a user-directed input where additional tags and other manual entry capabilities are made available to the user to add further context to that lifted by the context analyzer, as shown in box 212. With each update of the context, the query is regenerated and re-processed to return a refreshed list of prioritized music segments, as shown in box 204. The query is processed against a database of context tags related to music segments, as shown in box 203. The music segments are referred to by a discreet ID of the music content, and subsequently associated with one or more locations where that specific music segment is available. For instance, a particular song X from time index 0:13 to 0:45 may be available on Spotify®, iTunes®, local hard drive, and Sound Cloud®. The decision about where to play or transfer the music file from is made independently of the selection of the music segment content that may reside in a plurality of storage, shown in box 202, and streaming locations, shown in box 201. The database of context to music segment relationships may be local, distributed, or a dynamic crawler function. Additionally, a music context analyzer, as shown in box 434 of FIG. 4, generates tags for music segments based upon lyrical content, tonal analysis, and other sensors that are mapped to various user-meaningful tags such as emotion, style, and subject matter.

Once the prioritized music segment list is returned as shown in box 207 of FIG. 2, the top "best-fit" music begins to play in the viewer, and its title, artist, and other data is presented to indicate the current playing music, as shown in box 321. A user interface function including, but not limited to, swipe left/right or a button for "next" permits the selection of the next music in the ordered list, as shown in element 319. As stated, the user may also select additional context such as musical genre and style, shown in buttons 320, to add to the context causing a re-processing of the query, therefore returning a new ordered list of "best-fit" music segments causing the currently selected and playing music to be replaced with the newly returned top of the prioritized music list.

In the case of preparing an electronic composition, once the user is satisfied that the currently playing music is that which they would like embedded into their electronic composition, they may select a "soundtrack this moment" button to finalize the selection, as shown in element 322 of FIG. 3 and box 216 of FIG. 2. Optionally, a composite video file may be generated that embeds the selected music. A link to the selected music to be played or downloaded may be added to the electronic composition, and a watermark may be added to the electronic composition that indicates the music attached to it. Based upon the user's settings or in-line election, the electronic composition may be posted to any connected digital media location such as a social network or saved as a local file.

Various exemplary embodiments of the invention may include an overlay viewer of electronic media, shown in FIG. 3, which may include emojis, text, tags, video, images, audio, location data, and other data made available to the viewer. This viewer may overlay any electronic composition editor or builder such as a phone keyboard, social media post generator, and more. Once the electronic media is loaded into the viewer, a context analyzer evaluates the content and prepares a list of context elements to be used in a search query for applicable music segments, as shown in box 204 of FIG. 2. Examples of such context are specific emotions, image components such as person or scenery and mood based upon warmth of color, and more. A music query generator then reads the "lifted" context and prepares a query to search for applicable music segments and return a ranked, prioritized list of music, sorted by calculated applicability with "best-fit" at the top, shown in box 207. At any time, the query may be updated by changes in the electronic media itself within the viewer, or by a user-directed input where additional tags and other manual entry capabilities are made available to the user to add further context to that lifted by the context analyzer, shown in boxes 212, 213, and 214 of FIG. 2 and FIG. 3. With each update of the context, the query is regenerated and re-processed to return a refreshed list of prioritized music segments. The query is processed against a database of context tags related to music segments, as shown in boxes 427, 428, 429, and 430 of FIG. 4. Box 427 may include a music context and pointer store, which may itself include time-indexed emojis 428, time-indexed lyrics 429, and time-indexed moods 430, among other indexed categories. The music segments are referred to by a discreet ID of the music content, and subsequently associated with one or more locations where that specific music segment is available. For instance, a particular song X from time index 0:13 to 0:45 may be available on Spotify®, iTunes®, local hard drive, and Sound Cloud®, each of which may be a third party music source 425 or music store 426. The decision about where to play or transfer the music file from is made independently of the selection of the music segment content that may reside in a plurality of storage and streaming locations, as shown in box 427. The database of context to music segment relationships may be local, distributed, or a dynamic crawler function. Additionally, a music context analyzer generates tags for music segments based upon lyrical content, tonal analysis, and other sensors that are mapped to various user-meaningful tags such as emotion, style, and subject matter, as shown in box 434.

Once the prioritized music segment list is returned, the top "best-fit" music begins to play in the viewer, and its title, artist, and other data is presented to indicate the current playing music, as shown in box 215 and add button 322. A user interface function, including, but not limited to swiping left/right or a button for "next," permits the selection of the next music in the ordered list, as shown in element 319. As stated, the user may also select additional context such as musical genre and style to add to the context, as shown in element 320, causing a re-processing of the query, therefore returning a new ordered list of "best-fit" music segments causing the currently selected and playing music to be replaced with the newly returned top of the prioritized music list, as shown in add button 322.

In the case of preparing an electronic composition, once the user is satisfied that the currently playing music is that which they would like embedded into their electronic composition, they select a "soundtrack this moment" button to finalize the selection, as shown by the music video generator in box 216. Optionally, a composite video file is generated that embeds the selected music, a link to the selected music to be played or downloaded is added to the electronic composition, and a watermark is added to the electronic composition that indicates the music attached to it. Based upon the user's settings or in-line election, the electronic composition is posted to any connected digital media location such as a social network or saved as a local file.

In the case of a sound tracking a live-streaming electronic feed such as a video feed, keyboard entries, or augmented reality feed, the process is the same other than the user is actively listening to the currently selected music and the context changes as a result of the streaming content cause periodic re-generations of the query and subsequent ordered list of best-fit music segments which in turn update the currently playing music to that which is the best-fit considering the latest content. The rate of re-evaluation of context as well as re-querying for best-fit music are throttleable by the system, the user, or both and may be as quick as sub-millisecond intervals and as slow as never.

In one example, the software systems discussed in FIGS. 1-4 may be useful to create context tags for audio files that permit users, applications, and system to search audio files by context. Functionally, a sound file or sound stream will have an associated database of tags attached to time indexes of the sound, as shown in boxes 203 and 427. Examples:

This song is "sad" from 1:35 to 1:45
This song is about "rain" from 2:23 to 2:34
This song has a natural break at 1:21

There may be any number of tags. The tags themselves point to their nodal position in a context tree for easier searching as well as similar-meaning and different-meaning reconciliation functions. Tags may be added to the system overall manually by users, and electronically by context analyzers. Tags may be associated with audio files and time indexes within them manually and electronically by matching analyzers.

The ability for third party audio content analyzers to find audio positions that match given tags is accounted for in the design. Additionally, lyrics and phrases of lyrics are associated with tags. Different parts of the song may be located and tagged based on an associated lyric or phrase and joined to the context derived from the text of a social post, or content in a photo or video. These are sound tags.

In another example, the software systems discussed in FIGS. 1-4 may be useful to lift context off of electronic media posts and other compositions via text, emoji, image, and video analysis. Functionally, a composition of any kind may be analyzed for context. Compositions include text, images, video, and more. Compositions may be static as in social media posts, or streaming such as an Augmented Reality display or real-time video feed. The composition will be associated to a database of tags reflecting the context. Examples:

"Sad" based upon use of emoji
"Happy" based upon positivity of words used
"Rain" based upon image content There may be any number of tags. The tags themselves point to their nodal position in a context tree for easier searching as well as same-meaning and different-meaning reconciliation functions. Tags may be added to the system overall manually by users, and electronically by context analyzers. Tags may be associated with compositions electronically by matching analyzers. These are context tags.

In another example, the software systems discussed in FIGS. 1-4 may be useful to soundtrack electronic media posts with no special skills required and no or very little effort. For any given composition, the sound-tracking utility may be engaged. The utility evaluates any composition as it is developed or as posted in history. The context tags are derived based upon context lifting, as shown in box 213 functions which generate a search query against the sound tags library, as shown in box 205, which in turn attach to the actual sound files at time indexed points. The sound-tracking utility begins playing the best-match song as determined by a best-match sorting algorithm which sits between the query and the response. This algorithm is throttle able, responsible to machine learning, and may inherit a plurality of configurable factors such as listen-balancing sounds within a given context group, and pay-for-promote capabilities.

The user is presented with the ability to swipe the currently playing sound away, replacing it with the next song down the one-time generated list, as shown in element 319. The decision on what is next may be further refined by evaluating other properties of the sound just rejected, such as genre, style, intensity, etc., as shown in element 320. These adjustments may be based on assumption by an algorithm or asked explicitly of the user such as a message "Sorry you didn't like that one. Was it too country, too feminine, or too soft?" where each of those three options is clickable buttons to inject an additional context filter to the next-up sound. In addition, likely relevant "refining" tags scroll by to offer suggestions to tune the next sound option, based upon the tag tree.

Based upon these queries, analytics are pushed out to makers and sourcers of sound indicating where inventory in a context category is light, and asking makers and sourcers to associate any applicable sound segments with those tags, inspiring greater tagging. To ensure tagging accuracy, a quality assurance queue will allow unassociated people to listen to the newly tagged segment and agree or disagree with its validity in a blind evaluation. Further, the interface will permit a user to vote-down the song choice for reason of "doesn't make sense in this context."

In one exemplary application, the methods, software programs, and systems described herein may be used in secondary markets of music licensing for synchronization purposes. For instance, context based analysis and delivering music for license for commercial use may be contemplated. The technology may work similar to consumer applications, but may allow customers to purchase rights to use the music from within the interface. Additionally, context-based music may be useful to access voice and AI using voice commands to deliver music to customers based on their real world experiences and needs.

In another exemplary application, playing the "right music" for advertisements that is tailored to the user viewing the advertisement in an electronic medium will allow an advertisement to "look correct" even if the song is selected per user based on data that surrounds them or their personal music library.

In yet another exemplary application, the present invention may also include the use of cryptocurrency and blockchain. For example, the act of uploading content, tagging it by the content uploaders, QA review of tagging and tagging by users may be incentivized through the use of a cryptocurrency token. The token may be attached to the revenue of the company so that the participants making the ecosystem strong get a royalty payout pro-rata for that contribution.

The present invention may be used with and/or to augment any suitable social media platform, including but not limited to Facebook® and Instagram®. Along with having a proprietary library of appropriately tagged content, the present invention may enable "sound-tracking social posts,"

whether via auto-play of the first response from contextual best-fit music selection and/or manual search for context.

Figure 5:
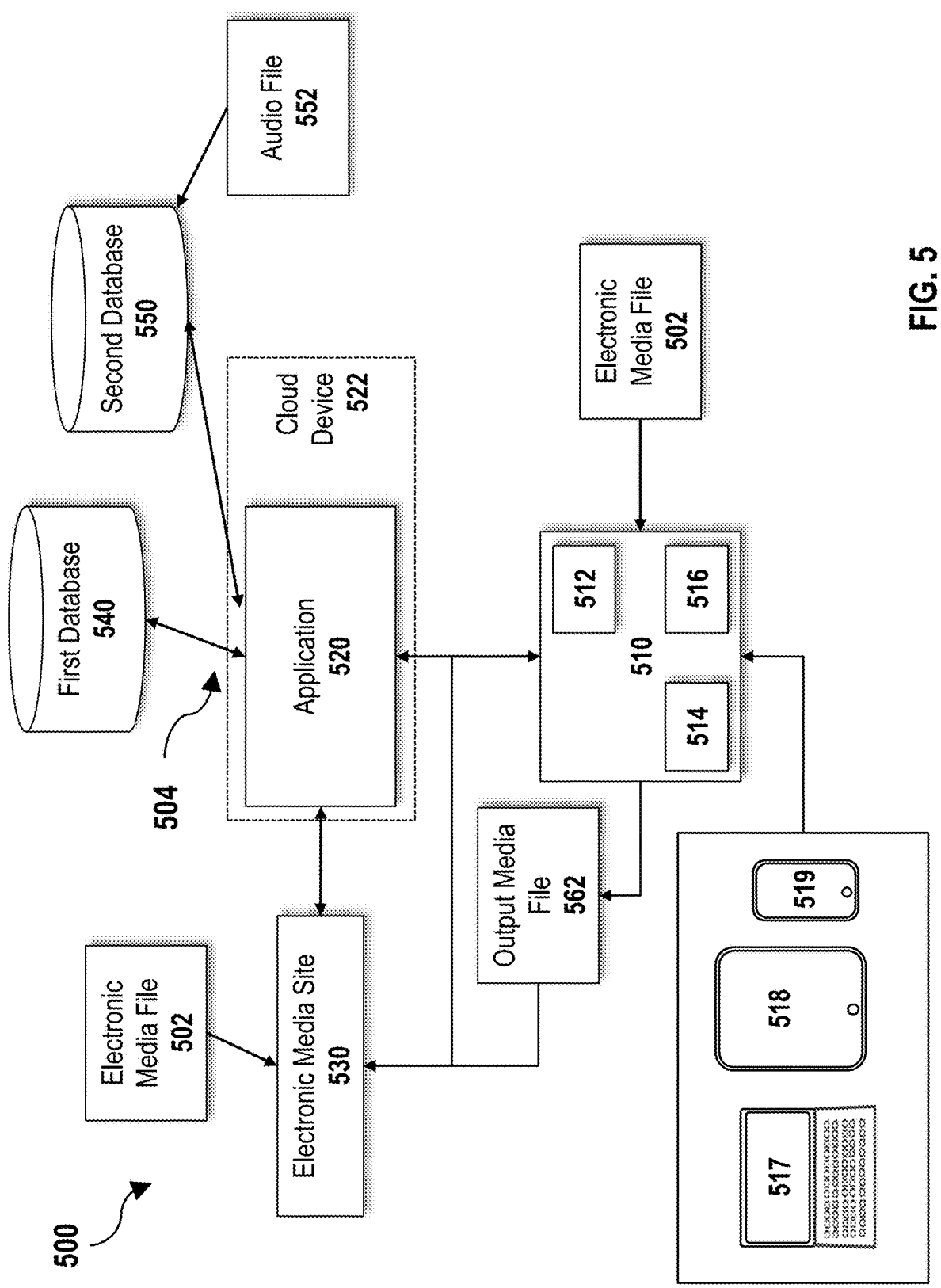
FIG. 5 is a block diagram of a system for contextually applying audio to an electronic media file, in accordance with the first exemplary embodiment of the present disclosure.

FIG. 5 is a block diagram of a system 500 for contextually applying audio to an electronic media file 502, in accordance with the first exemplary embodiment of the present disclosure. The system 500 may include a user computer device 510 and a first database 540 in communication with the user computer device 510 over at least one network connection 504. The first database 540 contains data corresponding to a plurality of context tags corresponding to at least one context of a plurality of audio file 552s. At least a second database 550 is in communication with the user computer device 510 over the at least one network connection 504. The at least second database 550 contains data corresponding to the plurality of audio file 552s. The user computer device 510 is configured to parse the electronic media file 502 to determine at least one context of the electronic media file 502, compare the at least one context of the electronic media file 502 against the first database 540 of context tags, generate a ranked list of audio file 552s corresponding to the comparison of the at least one context of the electronic media file 502 against the database of context tags 540, select at least one audio file 552 from the ranked list, and generate an output file 562 containing the electronic media file 502 and the at least one audio file 552. The at least one audio file 552 is accessed from the at least second database 550.

As described relative to FIG. 1, above, the user computer device 510 may be any suitable computer device employed by a user, including a desktop or laptop computer 517, tablet 518, or mobile phone 519. The user computer device 510 may include any components necessary to operate a user computer device 510, including a processor 512, computer-readable memory 514, and a power supply 516. The user computer device 510 may be in communication with first and second databases 540, 550 over at least one network connection 504. The at least one network connection 504 may be any suitable network connection, including the Internet, intranet, LAN, WLAN, satellite network, Wi-Fi, Bluetooth®, NFC, or other network connections. The first and second databases 540, 550 may be any suitable data storage media.

In one example, the system 500 may operate on a software application 520, which may be at least partially hosted on a cloud device 522. In one example, the application 520 may at least partially operate on the computer device 510. The application 520 may include computer-readable instructions for performing a method for contextually applying audio to an electronic media file, as described relative to FIGS. 1-4, above.

The application 520 may access or otherwise receive an electronic media file 502 in any suitable manner. In one example, the electronic media file 502 may be accessed from the user device 510, where it may be permanently or temporarily stored or being captured. In another example, the electronic media file 502 may be accessed across the at least one network connection 504, for instance, from an electronic media site 530. The electronic media file 502 may be received by the application on the cloud device 522 or on the user computer device 510.

The first database 540 may contain data corresponding to a plurality of context tags corresponding to at least one context of a plurality of audio file 552s, as described above. The at least second database 550 may contain data corresponding to the plurality of audio file 552s. In one example, there may be multiple additional databases containing data corresponding to the plurality of audio file 552s. For instance, different music access services, such as Spotify®, iTunes®, Google Play Music®, and the like may each provide a different database containing the plurality of audio file 552s. In one example, each audio file 552 may exist on one or more of the at least second databases 550. For instance, a particular song may only be accessed on a single second database 550. Alternatively, another song may be accessed on multiple second databases 550 at the discretion of the system or the user. This may allow a user having paid access to a particular music access service to select audio file 552s from that service when possible. In one example, the first and at least second databases 540, 550 may not be separate databases, but may be a single database accessed in multiple ways.

The software application 520 may direct a computer device 510, 522 to perform a computer-implemented method for contextually applying audio to an electronic media file, as described in greater detail in FIGS. 1-4, above. In one example, the user computer device 510 may be configured to parse the electronic media file 502 to determine at least one context of the electronic media file 502, compare the at least one context of the electronic media file 502 against the first database 540 of context tags, generate a ranked list of audio file 552s corresponding to the comparison of the at least one context of the electronic media file 502 against the database of context tags 540, select at least one audio file 552 from the ranked list, and generate an output file 562 containing the electronic media file 502 and the at least one audio file 552. The at least one audio file 552 is accessed from the at least second database 550. In another example, the cloud device 522 may be configured to perform at least a portion of the actions above.

After performing the method above, the software application 520 may generate an output media file 562. The output media file 562 may be a new file comprising the electronic media file 502 and the at least one audio file 552. In one example, the output media file 562 may not be a new file, but may be a stream or feed or the electronic media file 502 and the at least one audio file 552, along with playback instructions synchronizing the electronic media file 502 and at least one audio file 552 as desired by the application 520. In one example, the output media file 562 may be uploaded to an electronic media site 530. In one particular example, the user computer device 510 may output the output media file 562 to the electronic media site 530. In another example, the cloud device 522 may do so. It should be noted that, for live, real-time, or semi-real-time electronic media files 502, the output media file 562 may be output as the electronic media file 502 is being created, i.e., during the event being captured by the electronic media file 502. The electronic media file 502 may not be fully completed before the system 500 applies the method herein.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet. The computing system can include clients and servers. A client and server are generally remote from each other and typically interact through a communication network. The relationship of client and server arises by virtue of computer programs running on the respective computers and having a client-server relationship to each other.

Any of the features or attributes of the above the above described embodiments and variations can be used in combination with any of the other features and attributes of the above described embodiments and variations as desired. It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for contextually applying audio to media content, comprising the following steps:
   parsing electronic media content to determine at least one context of the electronic media content without using context-identifying text;
   comparing the at least one context of the electronic media content against a database of context tags corresponding to at least one context of a plurality of audio files;
   generating a ranked list of audio files corresponding to the comparison of the at least one context of the electronic media content against the database of context tags;
   selecting at least one audio file from the ranked list; and
   outputting the electronic media content together with the at least one audio file, wherein the steps of parsing the electronic media content to determine at least one context of the electronic media content and comparing the at least one context of the electronic media content against a database of context tags corresponding to at least one context of a plurality of audio files are performed while the electronic media content is being created, and wherein the remaining steps are performed after the electronic media content has been created.

2. The method of claim 1, further comprising the step of synchronizing the at least one audio file to the electronic media content.

3. The method of claim 1, wherein the method is performed while the electronic media file is being streamed.

4. The method of claim 1, wherein the at least one context of the electronic media content is at least one selected from the set of: subject matter, location, colors, text, texture, and lighting.

5. The method of claim 1, further comprising the step of determining at least one user-selected context of the electronic media content.

6. The method of claim 1, wherein the at least one audio file comprises at least a portion of a music file.

7. The method of claim 1, wherein a first-ranked audio file is automatically selected.

8. The method of claim 1, wherein a user selects the at least one audio file.

9. The method of claim 8, wherein the user selects the at least one audio file by accepting or rejecting each audio file sequentially according to the ranked list.

10. The method of claim 1, further comprising the step of uploading the output of the electronic media content together with the at least one audio file to an electronic media site.

11. A system for contextually applying audio to electronic media content, comprising:
   a user computer device;
   a first database in communication with the user computer device over at least one network connection, wherein the first database contains data corresponding to a plurality of context tags corresponding to at least one context of a plurality of audio files; and
   at least a second database in communication with the user computer device over at least one network connection, wherein the at least second database contains data corresponding to the plurality of audio files,
   wherein the user computer device is configured to:
   parse electronic media content to determine at least one context of the electronic media content without using context-identifying text;
   compare the at least one context of the electronic media content against the first database of context tags;
   generate a ranked list of audio files corresponding to the comparison of the at least one context of the electronic media content against the database of context tags;
   select at least one audio file from the ranked list; and
   output the electronic media content together with the at least one audio file, wherein the at least one audio file is accessed from the at least second database, wherein the steps of parsing the electronic media content to determine at least one context of the electronic media content and comparing the at least one context of the electronic media content against a database of context tags corresponding to at least one context of a plurality of audio files are performed while the electronic media content is being created, and wherein the remaining steps are performed after the electronic media content has been created.

12. The system of claim 11, wherein the electronic media content is synchronized with the at least one audio file.

13. The system of claim 11, wherein the at least one context of the electronic media content is at least one selected from the set of: subject matter, location, colors, text, texture, and lighting.

14. The system of claim 11, wherein the user computer device is further configured to determine at least one user-selected context of the electronic media content.

15. The system of claim 11, wherein the at least one audio file comprises at least a portion of a music file.

16. The system of claim 11, wherein a first-ranked audio file is automatically selected.

17. The system of claim 11, wherein a user selects the at least one audio file.

18. The system of claim 17, wherein the user selects the at least one audio file by accepting or rejecting each audio file sequentially according to the ranked list.

19. The system of claim 11, wherein the user computer device is further configured to output the electronic media content together with the at least one audio to an electronic media site.

* * * * *